US010130029B2

(12) United States Patent
Pellenc et al.

(10) Patent No.: US 10,130,029 B2
(45) Date of Patent: Nov. 20, 2018

(54) ROTARY CUTTING HEAD WITH WIRES AND ASSEMBLY CONSISTING OF SUCH A HEAD AND A DRIVE SHAFT FOR DRIVING SAID HEAD

(71) Applicant: PELLENC (SOCIETE ANONYME), Pertuis (FR)

(72) Inventors: Roger Pellenc, Pertuis (FR); Matthieu Blache, La Tour D'Aigues (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 65 days.

(21) Appl. No.: 14/425,514

(22) PCT Filed: Sep. 13, 2013

(86) PCT No.: PCT/FR2013/052107
§ 371 (c)(1),
(2) Date: Mar. 3, 2015

(87) PCT Pub. No.: WO2014/041316
PCT Pub. Date: Mar. 20, 2014

(65) Prior Publication Data
US 2015/0223395 A1 Aug. 13, 2015

(30) Foreign Application Priority Data

Sep. 14, 2012 (FR) ...................................... 12 58674

(51) Int. Cl.
*A01D 34/416* (2006.01)
(52) U.S. Cl.
CPC ..... *A01D 34/4161* (2013.01); *A01D 34/4163* (2013.01); *A01D 34/4166* (2013.01)

(58) Field of Classification Search
CPC ............ A01D 34/4163; A01D 34/4166; A01D 34/4161; A01D 34/416; A01D 34/4162; A01D 34/4165; A01D 34/4167
See application file for complete search history.

(56) References Cited

U.S. PATENT DOCUMENTS 3,497,908 A * 3/1970 Zamarra ................ F16C 11/045
16/257
4,989,321 A * 2/1991 Hoffmann .......... A01D 34/4162
30/276

(Continued)

FOREIGN PATENT DOCUMENTS

EP 1 421 840 A1 5/2004
EP 1 586 231 A1 10/2005

(Continued)

OTHER PUBLICATIONS

International Search Report, dated Dec. 18, 2013, from corresponding PCT application.

*Primary Examiner* — Jonathan Riley
(74) *Attorney, Agent, or Firm* — Young & Thompson

(57) ABSTRACT

The invention relates to a rotary cutting head with wires for a brush cutter, grass trimmer, edge trimmer, hedge trimmer or the like, said head comprising a housing (1) containing a supporting body (2) comprising a system (3, 3', 4, 4', 12) for blocking at least two cutting or shearing wires, and a peripheral wall (6) allowing the or each wire to be wound around said wall in said head. Said blocking system comprises at least two movable blocking elements (3, 3') that are independent from each other and each associated with a clamping surface (4, 4') built into the supporting body (2) and comprising a clamping face (10, 10') and a supporting face (11, 11'), and a single elastic body (12) that can exert stress on each clamping face (11, 11') for clamping and blocking each wire.

20 Claims, 5 Drawing Sheets

(56) References Cited

U.S. PATENT DOCUMENTS

| | | | | |
|---|---|---|---|---|
| 5,749,148 A * | 5/1998 | White, III | A01D 34/4163 |
| | | | 30/276 |
| 5,758,424 A * | 6/1998 | Iacona | A01D 34/4166 |
| | | | 30/276 |
| 6,263,580 B1 | 7/2001 | Stark et al. | |
| 6,336,249 B1 * | 1/2002 | Plumley | E05D 5/04 |
| | | | 16/225 |
| 6,347,455 B2 * | 2/2002 | Brant | A01D 34/416 |
| | | | 30/276 |
| 6,519,857 B1 * | 2/2003 | Proulx | A01D 34/416 |
| | | | 30/276 |
| 6,581,292 B2 * | 6/2003 | Allis | A01D 34/4166 |
| | | | 30/276 |
| 8,028,424 B2 * | 10/2011 | Legrand | A01D 34/4166 |
| | | | 30/276 |
| 8,069,574 B2 * | 12/2011 | Kato | A01D 34/416 |
| | | | 30/276 |
| 8,341,847 B2 * | 1/2013 | Kato | A01D 34/416 |
| | | | 30/276 |
| 2004/0128840 A1 * | 7/2004 | Proulx | A01D 34/4166 |
| | | | 30/276 |
| 2005/0229402 A1 * | 10/2005 | Iacona | A01D 34/416 |
| | | | 30/276 |
| 2006/0026846 A1 * | 2/2006 | Alliss | A01D 34/416 |
| | | | 30/276 |
| 2010/0000099 A1 * | 1/2010 | Arnetoli | A01D 34/4166 |
| | | | 30/347 |
| 2010/0287780 A1 * | 11/2010 | Doane | A01D 34/4161 |
| | | | 30/276 |
| 2013/0283623 A1 * | 10/2013 | Pellenc | A01D 34/416 |
| | | | 30/276 |
| 2014/0250699 A1 * | 9/2014 | Weimer | A01D 34/4166 |
| | | | 30/347 |

FOREIGN PATENT DOCUMENTS

| | | |
|---|---|---|
| EP | 2 380 424 A1 | 10/2011 |
| FR | 2 781 976 A1 | 2/2000 |
| WO | 2006/017372 A1 | 2/2006 |
| WO | 2008/139246 A1 | 11/2008 |

* cited by examiner

ROTARY CUTTING HEAD WITH WIRES AND ASSEMBLY CONSISTING OF SUCH A HEAD AND A DRIVE SHAFT FOR DRIVING SAID HEAD

BACKGROUND OF THE INVENTION

Field of the Invention

This invention relates to the field of portable motorized cutting devices comprising rotary cutting elements in the form of flexible or rigid wires and has as its object a rotary cutting head with wires for a brush cutter, a grass trimmer, an edge trimmer, a hedge trimmer, or the like. It also has as its object an assembly that consists of such a head and a drive shaft of said head.

Description of the Related Art

In a general way, a portable motorized cutting device comprises a sleeve comprising, in general at one of its ends, an internal combustion engine or an electric motor and a handle, generally U-shaped or round, for guiding and controlling the engine or motor, and, at its other end, a rotary cutting head with wires. There also exist systems in which the electric motor is located at the end of the cutting head. Each of these systems also comprises a motor shaft or drive shaft that is driven in rotation by the engine or motor and is engaged in a hub that is oriented and placed axially in the head to ensure the transmission of the drive torque to the latter.

These cutting heads are suitable for accommodating and holding one or more flexible wires, generally an even number so as to balance the movement and most often two wires arranged symmetrically relative to the axis of the head. Each wire is fixed in the head by locking one of its ends and radially extends beyond the latter toward the outside by its other end, in such a way as to form, in combination with the rotation of the head, one or more blades or cutting wire sides outside of the head, generally two cutting wire sides that are diametrically opposite relative to the axis of the head.

Among these cutting heads, some use one or more short wires that the user replaces as soon as the degree of wear and tear of the cutting wire side is too high. Other heads use long wires and for this purpose have a reservoir, i.e., a space or a chamber located in the head making it possible to extend the cutting wire side over a considerable length inside the head by winding it, in the form of a helical winding, around a cylindrical wall, called a reel, arranged in the head, for the purposes of constituting a reserve or a wire bobbin avoiding the frequent replacement of the wire or wires in the case of wear and tear or the cutting into sections of the cutting wire side.

In this type of head with winding, certain ones make it possible for the user to unwind the wound-up wire by a manual action at the level of the head or in a semi-automatic way by a system known under the name of "tap and go," as it wears, i.e., thanks to an impact delivered to the head during operation releasing a given length of wire thanks to the combination with the centrifugal force generated by the rotation of the head. Other heads with winding are suitable for making possible an automatic unwinding of the wound wire by means of an electric motor or by the centrifugal force alone.

Furthermore, these cutting heads comprise a protective jacket or housing comprising as many passage openings or eyelets as cutting wire sides and making possible the extension of the latter inside the head for their attachment by means of a tightening mechanism and/or their winding on a bobbin housed inside the head.

The document WO 2006/017372 describes a rotary cutting head with wires using short wires, i.e., without winding the latter in the head and in particular two or four short wires extending in a diametrically opposite way toward the exterior of the head. Each short wire is locked in the head by clamping, in a detachable manner, in a chamber that is substantially closed by means of a clamping mechanism including a movable tightening element combined with a spring, i.e., that each tightening element comprises its own spring, each spring tending to press the associated tightening element against the proximal end of the cutting side engaged in said chamber.

However, a cutting head of the type of the one described in the document WO 2006/017372, which is uniquely suited for accommodating short wires, requires a manual action for working each tightening element so as to remove the latter from the wire by going against the antagonistic action exerted by the spring to make it possible to retract it or to insert wire from the cutting head. This type of head, which requires neutralization or an action that goes against each spring by a specific manual action for releasing each wire for the purpose of their replacement, is therefore very restrictive for the user, requiring in a systematic way a prior cleaning of the head at the level of each spring-actuating mechanism.

The document FR 2 781 976 has as its object a cutting head comprising two wires that are integrated into a dual-chamber bobbin, one for each wire; the two chambers are superposed, by considering a vertical orientation of the axis of rotation of said head when the latter is in the state of work, and are separated by a radial partition positioned inside the head at the level of the exit eyelets of the wire of the cutting head. The head also comprises a mechanism for locking by friction that is housed in the radial partition and consists of an insertion guide or insertion channel narrowing inside the head for inserting the wire in question and locking the latter by friction over a certain length.

However, a head such as the one described in the document FR 2 781 976 has several drawbacks. First, the location of exit eyelets facing the radial partition separating the two superposed chambers generates a positioning of each wire away from the side of the lower end of the head, i.e., in the state of work of the latter, relatively high relative to the ground, requiring for short cuts to force the friction of the head onto the ground, which increases wear and tear and the cost of replacement of the pieces that are subject to wear and tear, and even to incline the head, which generates an excessive friction of each cutting wire side with the ground and thereby increases their wear and tear and their consumption. In contrast, the dimension of each channel for insertion of a wire making possible its friction is limited to the use of a single wire diameter, and each wire of different diameter or of different shape modifies in particular the locking effect by friction, which may be insufficient and lead to a detachment of the wire from the head during operation. Such a detachment entrains a significant loss in wire quantity that will go beyond the initial distance between the cutting wire side and its end at the time of its initial introduction into the head. In addition, to ensure a locking force by means of sufficient friction of the wire so as to keep the latter at the beginning of coil-winding or winding, the length of each channel should be significant, which at the end of winding generates a considerable loss in the length of wire that could be usable for forming a cutting wire side. Finally, this type of head is not suitable for short wires.

BRIEF SUMMARY OF THE INVENTION

This invention has as its object to remedy these drawbacks by proposing a rotary cutting head with wires for a brush cutter, a grass trimmer, an edge trimmer, a hedge trimmer, or the like, of fairly low cost and that is suitable for accommodating long or short cutting wires, rigid or flexible, of varied shapes and sizes while incorporating a small number of pieces that are subject to wear and tear and by ensuring a rapid replacement of each cutting wire and, if necessary, a rapid winding of each wire. Furthermore, such a head according to this invention makes it possible to optimize the use of the cutting wire by limiting or by reducing the remaining wire length or the wire length that is unusable, extending into the head when the wire is worn, deteriorated, or cut into sections and/or, if necessary, all the way unwound.

For this purpose, the rotary cutting head with wires, according to this invention, for a brush cutter, a grass trimmer, an edge trimmer, a hedge trimmer, or the like, with said head comprising, on the one hand, a hub extending centrally and axially into the latter for accommodating a drive shaft in such a way as to make possible, using means for connection and for transmission of the drive torque, the driving in rotation of said head around its axis of rotation and axial locking means of the head on the drive shaft, and, on the other hand, a housing sheltering a support body that comprises a locking system of at least two wires for cutting or for long- or short-mowing, and, optionally, a winding shaft, preferably integral with the support body, making possible, if necessary, the winding of each long wire in said head that also comprises connecting means between the housing and the support body, and of which said hub is integral with the housing and/or the support body, and said housing comprises at least two openings for the passage of said wires through the latter, is characterized in that the locking system comprises, on the one hand, at least two movable locking elements, independent of one another, and each associated with a tightening surface integrated in the support body and comprising a tightening face and a support face, and, on the other hand, a single elastic element capable of exerting and applying stress on the support face of each locking element making it possible to tighten and to lock each wire between the tightening face of the locking element in question and the associated tightening surface, and in that, optionally, the support body and the housing are suitable for being mounted in rotation relative to one another for the purpose of making possible, if necessary, the winding of each long wire, in the tightening and locking state, around the winding shaft.

This invention also has as its object an assembly of a rotary cutting head with wires for a brush cutter, a grass trimmer, an edge trimmer, a hedge trimmer, or the like and a drive shaft for a portable motorized cutting device, with said drive shaft being able to be mounted in the hub of said head to ensure the transmission of the drive torque to the latter, with said cutting head having the defined characteristic of the cutting head according to this invention, and is characterized in that the axial locking means comprise control means and are suitable, on the one hand, for controlling and for making possible, if necessary starting from a state of insertion with pre-tightening of each wire and prestressing of the single elastic element, the locking or the axial unlocking of the head on the drive shaft, and, on the other hand, namely, in the locking state, for establishing the stressing of the elastic element on the locking elements making it possible to implement the tightening and the locking of each wire in the head, and, in the unlocking state, for eliminating said tightening stress.

BRIEF DESCRIPTION OF THE DRAWINGS

The invention will be better understood using the description below, which relates to a preferred embodiment, provided by way of nonlimiting example and explained with reference to the accompanying diagrammatic drawings, in which.

DETAILED DESCRIPTION OF THE PREFERRED EMBODIMENTS

Figure 1:
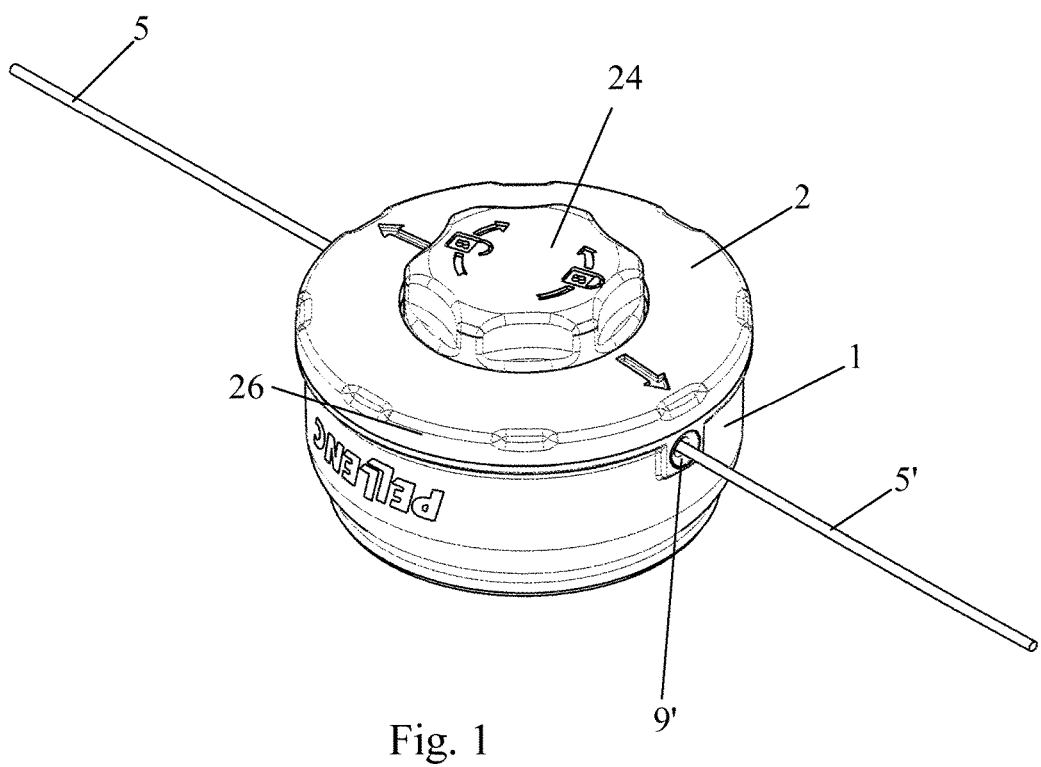
FIG. 1 shows a perspective view of the cutting head according to this invention, comprising two cutting wire sides each forming a cutting element, in an upside-down configuration of the head (by considering a vertical orientation of the axis of rotation of the head or in the state of work of the latter)

The figures show a rotary cutting head with wires, according to this invention, for a brush cutter, a grass trimmer, an edge trimmer, a hedge trimmer, or the like, with said head comprising, on the one hand, a hub 18, 19 that extends centrally and axially into the latter for accommodating a drive shaft 20 in such a way as to make possible, using means for connection and transmission of the drive torque 21, 22, the driving in rotation of said head around its axis X of rotation and axial locking means 23, 24, 28 of the head on the drive shaft 20 and, on the other hand, a housing 1 sheltering a support body 2 that comprises a locking system 3, 3', 4, 4', 12 of at least two wires 5, 5' for cutting or for long- or short-mowing, and, optionally, a winding shaft 6, preferably integral with the support body 2, making possible, if necessary, the winding of each long wire 5, 5' in said head that also comprises means 7, 8 for connection between the housing 1 and the support body 2, and of which said hub 18, 19 is integral with the housing 1 and/or the support body 2, and said housing comprises at least two openings 9, 9', such as, for example, eyelets, for the passage of said wires through the latter, more particularly each wire 5, 5' through each opening 9, 9'.

In accordance with this invention, the locking system 3, 3', 4, 4', 12 comprises, on the one hand, at least two movable locking elements 3, 3', independent of one another, and each associated with a tightening surface 4, 4' integrated in the support body 2 and comprising a tightening face 10, 10' and a support face 11, 11' and, on the other hand, a single elastic element 12 capable of exerting and applying stress on the support face 11, 11' of each locking element 3, 3' making it possible to tighten and to lock each wire 5, 5' between the tightening face 10, 10' of the locking element 3, 3' in question and the associated tightening surface 4, 4'. In addition, the support body 2 and the housing 1 can be suitable for being mounted in rotation relative to one another, preferably around the axis X of rotation of the head, for the purpose of making possible, if necessary, the winding of each long wire 5, 5', in the tightening and locking state, around the winding shaft 6.

It is understood that this invention can provide a cutting head that is only suitable for accommodating short wires 5, 5', i.e., without providing a winding shaft 6 or another element forming a winding bobbin in the head, namely a head that is suitable for accommodating short wires 5, 5' and long wires 5, 5' by comprising for this purpose the winding shaft 6 making possible the winding of long wires 5, 5' in the head and more particularly in a winding chamber arranged in the head and that can be delimited, for example, between a peripheral wall of the support body 2 and the inner wall of the housing 1, as we will see in detail below.

In a preferred embodiment, each locking element 3, 3' can be mounted to pivot around a pivoting shaft 13, 13'. In addition, each pivoting shaft 13, 13' can be integral with the locking element 3, 3' in question and able to be mounted in a bearing 14, 14' that is fixed or integrated, by means of a bearing support 141, 141', in the support body 2 (FIGS. 2, 3, 5, 6, 7). In a variant, not shown, each pivoting shaft can be integral with the support body 2 and able to be mounted in a bearing that is fixed or integrated in the locking element 3, 3' in question.

Furthermore, each pivoting locking element 3, 3' can comprise a contact surface 110, 110' preferably located behind the support face 11, 11' of the side opposite to the latter relative to the pivoting shaft 13, 13'. Preferably, the contact face and the support face of each locking element can be located on both sides of a plane containing the pivoting shaft of the latter, this so as to offset them relative to one another to allow a swinging space for each support face (FIGS. 2, 3, 5, 6, 7). Such a contact face 110, 110' makes it possible for a user to carry out, by pressure on said contact face, a manual swinging of each locking element 3, 3' separating each tightening face 10, 10' from the associated tightening surface 4, 4' for releasing the wire 5, 5' in question that is locked between these surfaces.

Preferably, each tightening surface 4, 4' can extend in a plane that is essentially perpendicular or inclined relative to the axis (X) of rotation of the cutting head, and the pivoting shaft 13, 13' of each locking element 3, 3' can extend essentially parallel to the tightening surfaces (FIGS. 2, 3, 5, 6).

Preferably, each locking element 3, 3' or each bearing 14, 14' can be positioned in the head, preferably close to or essentially at the same level as the lower side (in considering a vertical orientation of the axis of rotation of said head in the state of work of the latter) of the head, whose inner face of said lower side can consist of the bottom 200 (FIG. 2 and FIG. 3) of the support body 2 or the peripheral wall, this in such a way as to be able to position the cutting wires 5, 5' and therefore the cutting plane close to the ground or the surface to be cut and to make possible the production of short cuts without forcing the friction of the head onto the ground or without having to incline the head, in particular with an excessive angle of inclination, and therefore to make possible a lesser wear and tear of the latter and cutting wire sides.

In a preferred embodiment, the winding shaft 6 can be fixed in the support body 2 and can consist of the peripheral wall, preferably in a cylindrical shape.

One of the end faces of the cylindrical peripheral wall 6 can be open, and the other end face can be closed by a bottom 200. In addition, when each locking element 3, 3' is mounted to pivot, this invention can provide that each bearing support 141, 141' can be fixed on said bottom 200 (in particular FIGS. 2 and 3).

Furthermore, the housing 1 can have an overall cylindrical shape by being open at one of its ends or semi-spherical in such a way as to be able to accommodate the support body 2, and, if necessary, the peripheral wall forming the winding shaft 6. In addition, the latter can extend laterally, in particular at the level of its bottom, toward the outside, by a collar 26 that can accommodate the free edge of the housing 1 for the purpose of making it possible to guide the latter in rotation relative to the support body 2 (figures). Such a collar 26 can comprise stiffeners 27 to ensure its structural rigidity and to make possible in particular its procurement by a molding process by injection of material. Likewise, the support body 2 can also comprise stiffeners 27', in particular between its bottom 200 and the peripheral wall 6, for the same reason.

Thus, in the case where the support body 2 comprises the winding shaft 6 for accommodating the long wires 5, 5', the support body 2 can have a bobbin shape overall.

Figure 2:
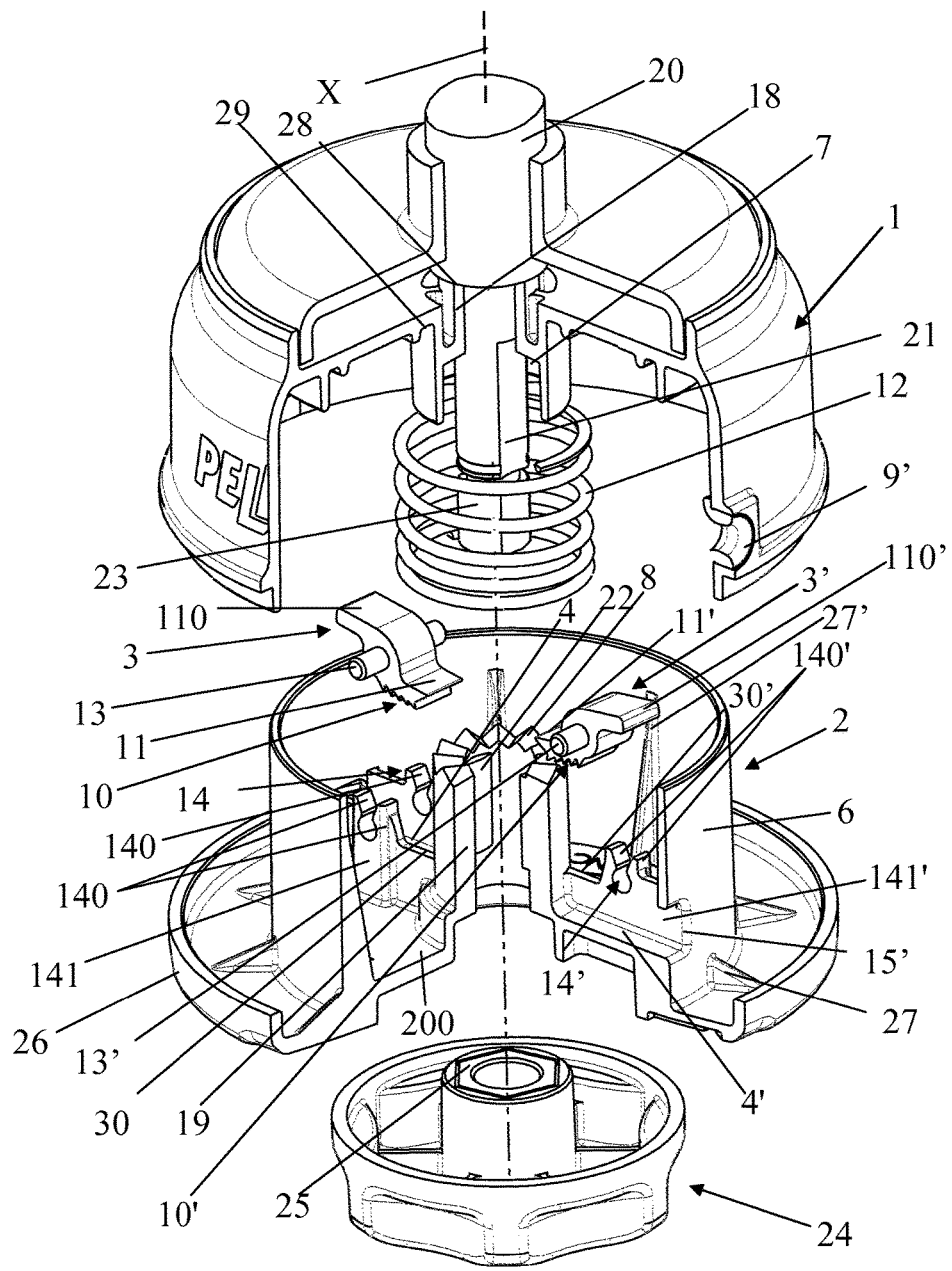
FIG. 2 shows a perspective, partial cutaway and exploded view of an assembly according to this invention composed of the cutting head as oriented and shown in FIG. 1, without the cutting wires, and a drive shaft mounted in the housing of said head.
Figure 3:
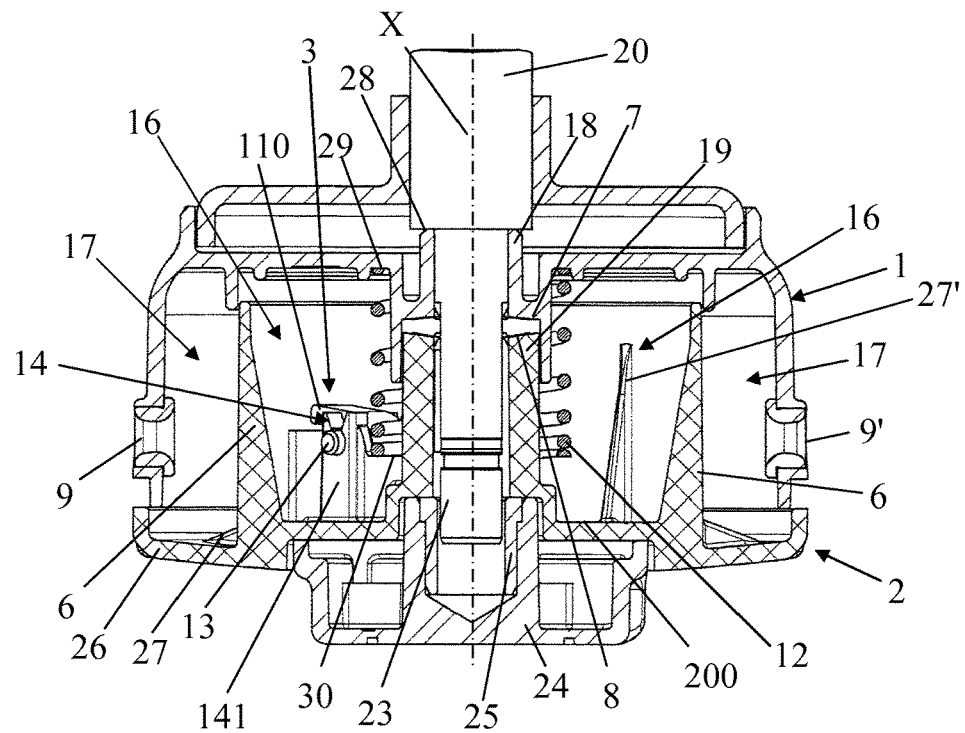
FIG. 3 shows a transverse cutaway view of the assembly shown in FIG. 2, without cutting wires, in the mounted state of the head and in a configuration making possible the free rotation of the housing relative to the support body.

In the case where each pivoting shaft 13, 13' can be integral with the pivoting locking element 3, 3' in question, this invention can provide that each bearing support 141, 141' can have at least one opening for insertion of the pivoting shaft 13, 13' into the bearing 14, 14' in question and that each insertion opening can be delimited by elastically deformable walls 140, 140' in such a way that the pivoting shaft 13, 13' of each locking element 3, 3' can be inserted into the bearing 14, 14' in question by reversible elastic interlocking (in particular, FIGS. 2 and 3). Such an interlocking makes possible in particular the disassembly of each locking element 3, 3' of the support body 2, this easily and without the use of a specific tool.

If reference is made more particularly to FIGS. 2, 3, 5, 6 and 7, it is possible to see that in a preferred embodiment of each locking element 3, 3', the latter can each have two first opposing lateral faces and two second opposing faces that are essentially perpendicular to said first faces, of which one of said second opposing faces forms the tightening face 10, 10' and the other second opposing face forms the support face 11, 11'. In addition, the pivoting shaft 13, 13' of each locking element 3, 3' can pass through said first faces in an essentially perpendicular manner and can consist of, for example, two lateral shafts or journals each fixed on one of said first faces.

In a preferred embodiment of each bearing support 141, 141', the latter can each comprise two opposite flanges that can each integrate a bearing that can accommodate, in an essentially perpendicular manner to said flanges, one of the two journals of the locking element 3, 3' in question in such a way that each locking element may be able to pivot between the two corresponding flanges (FIGS. 2, 3, 5, 6 and 7). In addition, each tightening surface 10, 10' can extend between the two flanges of one of said bearing supports, and the space separating the walls of each bearing can form a passage for accommodating and guiding, preferably extending radially relative to the axis of rotation of the head, for each wire 5, 5' in the support body 2 for the purpose of its tightening and locking (in particular FIGS. 5, 6 and 7).

The peripheral wall that forms the winding shaft 6 can comprise two passage openings 15, 15' making possible the passage of each wire 5, 5' through one of these openings.

In addition, the head according to this invention can comprise two essentially concentric chambers 16 and 17, namely a central chamber 16 that can be delimited between the hub 18, 19 and the peripheral wall 6 and that can accommodate the locking system 3, 3', 4, 4', 12 and a peripheral chamber 17 that can be delimited between said peripheral wall and the inner wall of the housing 1 and that can accommodate, if necessary, the winding of each wire 5, 5' (FIGS. 3, 5, 6, 7 and 8). More particularly, the peripheral chamber 17 can be delimited, if necessary, at the level of the bottom 200 of the support body 2 by the collar 26 cooperating with the free edge of the housing 1.

In a preferred embodiment, the elastic element 12 can be a spring, more preferably a helical spring 12 coaxially surrounding the hub 18, 19, which then axially passes through said spring (FIGS. 2, 3, 5, 6, 7, 8).

Preferably, the hub 18, 19 can comprise, on the one hand, a first part of the hub 18 that is integral with or integrated in the housing 1 and a second part of the hub 19 that is integral with or integrated in the support body 2, and, on the other hand, connecting means 7, 8 that make it possible to connect said first and second hub parts 18, 19 to one another and in the extension with one another by preventing their rotation relative to one another. In addition, said connecting means 7, 8 can also form connecting means between said housing 1 and said support body 2 in such a way as to make it possible to connect them together, with locking in rotation relative to one another, for allowing the rotation of the head, locked axially on the drive shaft 20, or their disconnection or separation for making possible, in particular, the disassembly of the head or the access to the locking elements 3, 3' or, in the case where the support body 2 and the housing 1 are suitable for being mounted in rotation relative to one another, the winding of each wire 5, 5' (FIGS. 2, 3, 5, 6, 7).

As can be seen more particularly in FIG. 2, the connecting means 7, 8 can consist of, for example, striae made in each hub part 18, 19. More particularly, the second hub part 19 can comprise striae 8 made in its free end edge, and the first hub part 18 can comprise an inner shoulder comprising striae 7 in such a way as to make possible the interlocking of the striated edge of the second hub part 19 in the first hub part 18 with contact of the striae of the respective parts for establishing the above-mentioned connection (FIGS. 2, 3, 5, 6, 7, 8).

Preferably, the single elastic element 12 can be a single helical spring coaxially surrounding the hub 18, 19 over all or a part of its length. The helical spring 12 can be held axially between a first stop face 29 that is integral with the housing 1 and by each support surface 11, 11' of the locking elements 3, 3'. It is understood that the single spring can then be held axially in the head by means of its terminal coils that can come to rest, for one of its ends, against the first stop face 29, which can be fixed or integrated in the housing 1, for example by being formed by a part of the bottom 200 of the housing 1, and, for the other end of the spring, against the support faces 11, 11' of the locking elements 3, 3' (FIGS. 2, 3, 5, 6, 7, 8).

Figure 5:
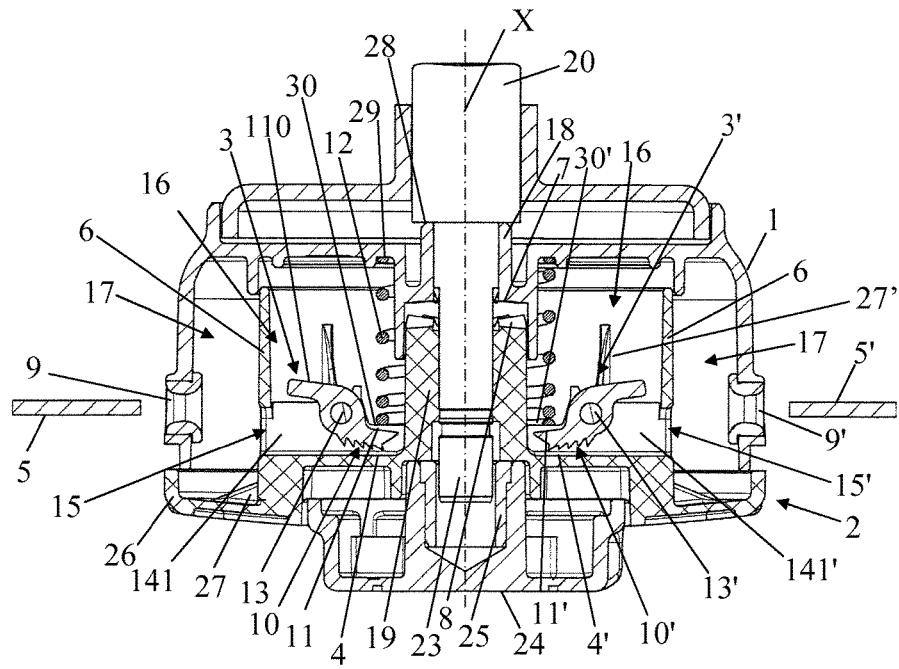
FIG. 5 shows a transverse cutaway view of the assembly shown in FIG. 4.
Figure 6:
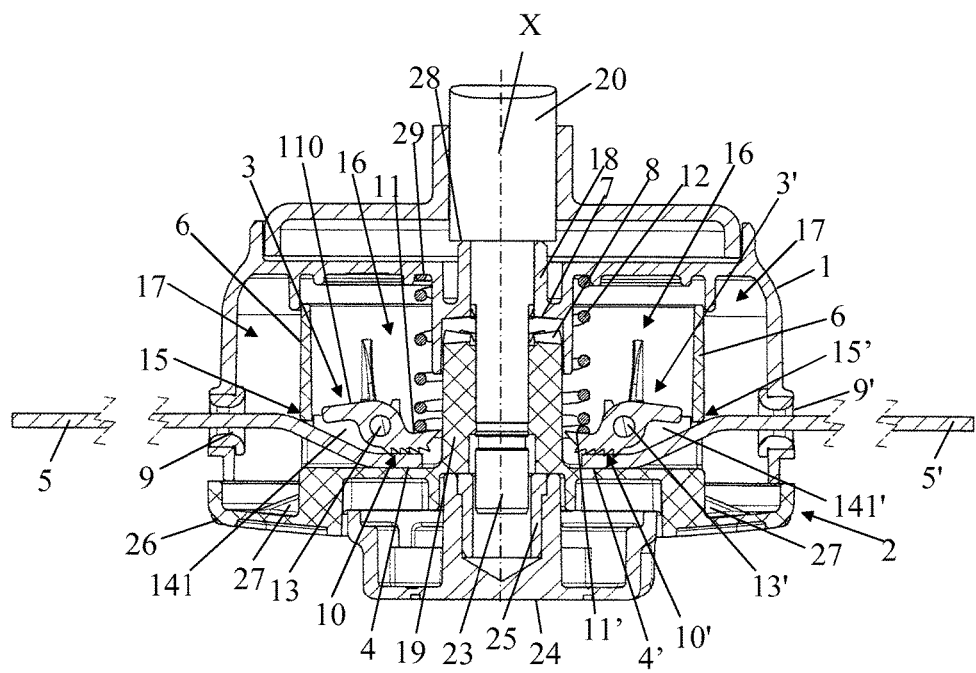
FIG. 6 shows the assembly shown in FIG. 5 with the two wires inserted in the head and in the pre-tightening state of the latter.
Figure 7:
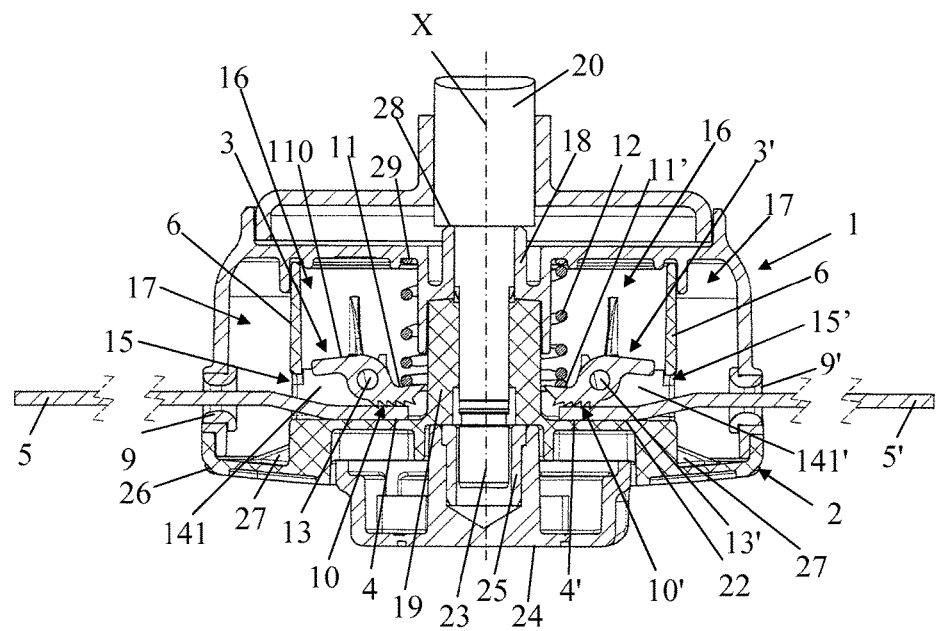
FIG. 7 shows the assembly shown in FIG. 5 with the two cutting wires inserted in the head and in the state of the final tightening and locking of the wires and in the state of connection between the head and the support body preventing the rotation of one of the latter relative to the other.
Figure 8:
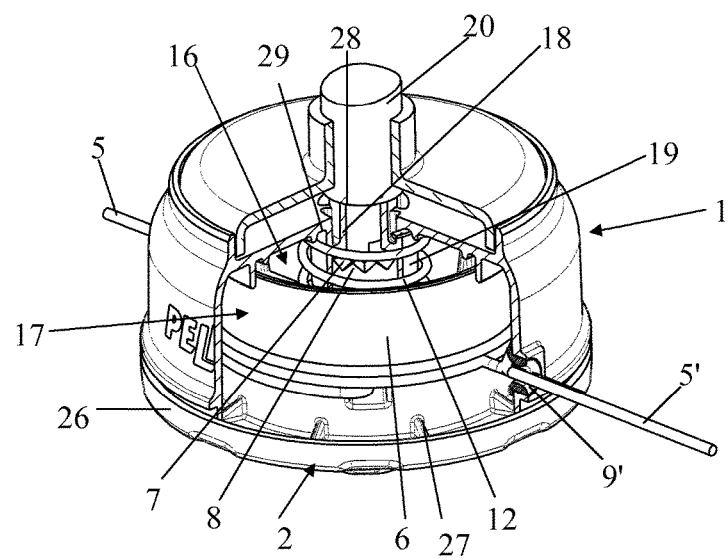
FIG. 8 shows a perspective view of the cutting head shown in FIG. 1 with a partial view of the housing.

In an additional characteristic, the head can comprise a second stop face 30, 30', and the spring can be held axially, in the state where the wires 5, 5' are not inserted, between the first stop face 29 and the second stop face 30, 30' that then forms a stop that prevents the spring 12 from coming into contact with the support faces 11, 11' of the locking elements 3, 3', this so as to prevent, under the stress of the spring 12, contact under pressure of each tightening face 10, 10' with the respective tightening surfaces 4, 4', in the state where the wires 5, 5' are not inserted into the head and therefore to prevent wear and tear or deterioration of said tightening faces (in particular FIGS. 2 and 5).

Preferably, the second stop face 30, 30' can consist of a face of each support bearing 141, 141', for example by the outer face of the free side of each flange, of the support bearing 141, 141' in question, opposite to their attachment side (in particular FIGS. 2 and 5).

In a preferred embodiment, the first stop face 29 can be adjusted by axial spacing, i.e., by drawing together or by axial separation, relative to each support face 11, 11' or, in the absence of wire, the second stop face 30, 30', this in such a way as to be able to adjust the return force of the single spring 12 and therefore the stress exerted by this spring on any locking element 3, 3' whatsoever to facilitate pre-tightening during the insertion of each wire 5, 5' or in the state of insertion of the wires 5, 5' for implementing their tightening with locking.

Such an adjustment can be carried out by, for example, moving the support body 2 into the housing 1, by a relative axial movement relative to one another along the axis X of rotation of the head.

FIGS. 2, 3, 5, 6, 7, and 8 also show an assembly that consists of a rotary cutting head with wires, for a brush cutter, a grass trimmer, an edge trimmer, a hedge trimmer, or the like, and a drive shaft 20 for a portable, motorized cutting device, with said drive shaft 20 being able to be mounted in the hub 18, 19 of said head to ensure the transmission of the drive torque to the latter, with said head having the characteristics that are defined according to this invention.

In accordance with this invention, the axial locking means 23, 24, 28 comprise control means 24 and are suitable, on the one hand, for controlling and making possible, optionally or if necessary starting from a state of pre-tightening of each wire upon its insertion and of prestressing of the single elastic element, the locking or axial unlocking of the head on the drive shaft 20, and, on the other hand, namely, during the locking, for establishing, in the locking state, the stress of tightening the elastic element 12 on the locking elements 3, 3' by means of the support faces 11, 11' making it possible to implement the tightening and the locking of each wire 5, 5' in the head, and, in the unlocking state, for eliminating said tightening stress.

The axial locking means 23, 24, 28 can also be suitable, if necessary, either, in the locking state, for establishing the connection, using means for connection and locking 7, 8, between the first and second hub parts 18, 19, or, in the unlocking state, for establishing, under the action of the single elastic element 12 exerting a stress going against said connection, the disconnection between said first and second hub parts.

In a preferred embodiment of the assembly, the drive shaft 20 can be terminated at its free end by a connecting tip 23, and the locking means 23, 24, 28 can comprise the tip 23 and a control piece 24, forming said control means, mounted in rotation, around the axis X of said head, on said tip. The control piece 24 can work with the support body 2 in such a way that the rotation of the control piece 24 can bring about a translational movement of the support body 2 in the housing 1, along the axis X of rotation of the head, able to make it possible, in the direction of rotation of said piece, either, in a direction of rotation that makes it possible to implement the locking, to establish the tightening stress and, if necessary, the connection between the first and second hub parts 18, 19, or, in a direction of rotation that makes it possible to implement the unlocking, to eliminate or to reduce the tightening stress and, if necessary, the disconnection between said first and second hub parts.

It is understood that establishing the tightening stress is achieved either directly starting from a state without pre-tightening of the wires 5, 5' because of a prestressing of the single elastic element 12 on the locking elements that can be provided by this invention or following said prestressing, and in this case, establishing the tightening stress will correspond to an increase in the pre-tightening stress.

In a preferred embodiment of the tip 23, the latter can comprise, on its outer lateral face, a threading, and the control piece 24 can comprise a tapping, for example integrated in a nut 25 that is integral with the control piece 24, making it possible to make a connection by screwing between the control piece 24 and the tip 23 and the rotation of the latter for the purpose of producing the above-mentioned effects in the direction of rotation of the control piece 24.

In a preferred embodiment of the assembly, the means for connection and transmission of the drive torque 21, 22 making it possible to ensure the transmission of the drive torque between the drive shaft 20 and the hub 18, 19 can consist of the first connecting means 21 that are integral with the drive shaft 20 and of the second connecting means 22 that are integral with the second hub part 19 in such a way that the housing 1, by means of the first hub part 18, can be mounted freely in rotation on the drive shaft 20 and that the support body 2 can ensure, after locking the control piece 24, the transmission of the drive torque to the hub 18, 19 and therefore to the cutting head (in particular FIG. 2).

It will be noted that this invention can provide a locking in translation of the housing on the drive shaft 20, which for this purpose can comprise a shoulder 28 that abuts, during its insertion into the hub 18, 19, against a stop of the housing 1, formed by, for example, an edge of the first hub part 18 of the housing (FIGS. 2, 3, 5, 6, 7, 8).

Figure 4:
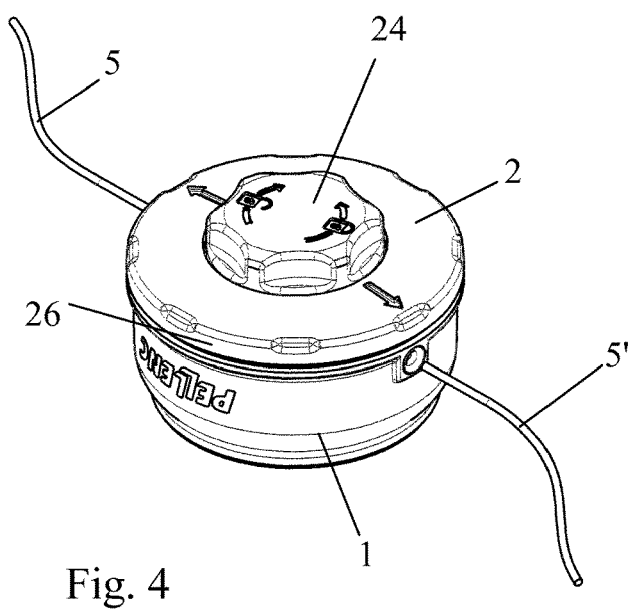
FIG. 4 shows the cutting head shown in FIG. 1 in the mounted state of the head and in a configuration of the head ready to accommodate the wires and making possible the free rotation of the housing relative to the support body.

The head and the assembly according to this invention can thus be put successively in a mode of insertion (FIG. 5) of each wire 5, 5', short or long, if necessary in a pre-tightening mode (FIG. 6) of each inserted wire 5, 5' and in a mode of tightening and of locking (FIG. 7) each wire 5, 5' in the head. In advance of these modes, the head can be mounted or controlled in such a way as to leave free the rotation between the housing 1 and the support body 2. Said control, starting from a state where the head already comprises inserted wires 5, 5', can consist, for the user, in working the control piece 24 by making it turn around the axis X of rotation of the head in such a way as to disconnect the two hub parts 18 and 19, under the action of the single elastic element 12, and therefore to separate and to release the rotation of the housing 1 and of the support body 2 relative to one another. In contrast, a reference can be made to the outer surface of the support body 2, such as, for example, an inscribed arrow (FIGS. 1 and 4) in such a way as to make possible the positioning of each locking element 3, 3', more particularly each passage opening 15, 15' opposite each eyelet 9, 9'. Thus, in the insertion mode, the user can then engage each wire 5, 5' through the corresponding eyelet 9, 9' toward the locking element 3, 3' in question, more particularly between the two flanges 141, 141' of each bearing 14, 14' and between the tightening face 10, 10' of the locking element in question and the corresponding tightening surface 4, 4' of the support body 2. Each wire 5, 5' can be engaged, optionally until it abuts the outer wall of the hub 18, 19, to inform the user that the wire 5, 5' is properly positioned.

In this insertion mode, the spring can be arranged in such a way that the stress exerted on each locking element 3, 3' is zero. Preferably, the spring can be arranged in such a way that the stress exerted on each locking element 3, 3' is less than the tightening stress in such a way as to establish a prestressing on the tightening elements allowing the insertion of each wire 5, 5' between the tightening face 10, 10' of the locking element 3, 3' in question and the associated tightening surface 4, 4' while ensuring a pre-tightening of each wire 5, 5' making it possible to retain and to hold the latter in the head. The pre-tightening also makes it possible to implement, in the case of long wires, and thanks to their being held by one of their free ends in the head, their winding in the peripheral chamber 17 around the peripheral wall 6 by the relative rotation between the support body 2 and the housing 1, and this regardless of the direction of the winding.

Then, once each wire 5, 5' is inserted, by preferably implementing the pre-tightening of each wire 5, 5', the user, in the tightening mode, can initiate the connection of the housing 1 with the support body 2, if necessary with locking in the position of rotation of the head on the drive shaft, this by working, if necessary, the control piece 24 by making it turn in such a way as to implement the locking in the position of rotation of the connection of the two hub parts 18, 19 with one another and in stressing the single elastic element 12 for applying the tightening stress on the support face 11, 11' of each locking element 3, 3'. Such a stress has the effect, under the combined action of each locking element 3, 3' and, if necessary, of the teeth made in the tightening faces 10, 10' and of the pressure exerted by the stress of the single elastic element 12, of establishing or, in the case of pre-tightening, of increasing the tightening of the wires 5, 5' between said tightening surfaces 4, 4' and the support faces 10, 10'. In the state of tightening and locking the head, the wires 5, 5' can no longer be removed in the opposite direction.

It will be noted that at the end of winding the long wires 5, 5' or when the sides of short wires 5, 5' forming the cutting elements are worn down, the remaining wire part between each eyelet 9, 9' and their locking point in the head is limited and reduced, which makes it possible to optimize the wire length that cannot be used contrary to the current systems whose remaining wire part in the head is of greater length or whose inadequate tightening systems cause their premature loosening and the ejection of a large amount of wire during the operation of the head.

More particularly, it will be understood that in the case of long wires 5, 5', once the latter are engaged or interlocked between the tightening faces 10, 10' of the locking elements 3, 3' and the associated tightening surfaces 4, 4', the user has only to turn the support body 2 relative to the housing 1 in any of the two possible directions of rotation around the axis of rotation of the head, so as to wind or to coil-wind the wires around the peripheral wall 6 in the peripheral chamber 17 and then, for the purpose of winding or coil-winding, to cut the parts of the wires exiting from the head to the desired length for forming the cutting wire sides. Likewise, in the case of short wires 5, 5', once each wire 5, 5' is inserted in the tightening position, the user has only to use the cutting head as such or to cut each wire 5, 5' to obtain the length of cutting wire side that is desired.

For the removal or withdrawal of each worn-out wire 5, 5' from the head, the user can, if necessary, turn or completely unscrew the control piece 24 from the tip 23 so as to disengage the action or to eliminate the stressing, and, if necessary, the prestressing, of the elastic element 12 on each locking element, making it possible for it to leave the support body 2 of the housing 1 and to remove the wires 5, 5' by simply making each pivoting element swing in the opposite direction, for example by resting on their respective contact faces 110, 110'.

The constituent elements of the head, and in particular the support body 2 and the housing 1, can be made of any material and more particularly regarding the housing 1, preferably from a metal or plastic material, and regarding the support body 2, preferably from a plastic material. More particularly, preferably, the locking elements 3 can be made from a metal material.

Of course, the invention is not limited to the embodiment described and shown in the accompanying drawings. Modifications are possible, in particular from the standpoint of the composition of the various elements or by substitution of equivalent techniques, without thereby exceeding the scope of protection of the invention.

The invention claimed is:

1. A rotary cutting head with wires, the head comprising:
    a hub extending centrally and axially into the rotary cutting head and being configured to accommodate a drive shaft to enable driving in rotation the head around an axis of rotation of the head and an axial locking system configured to axial lock the head on the drive shaft;
    a housing sheltering a support body that comprises a support body locking system used with at least two wires for cutting or for mowing, the support body locking system comprising
        at least two movable locking elements separately rotatable, independent of one another, and each associated with a respective tightening surface integrated in the support body, the at least two movable locking elements each comprising a respective tightening face and a respective support face, and
        a single elastic element disposed about the axis of rotation of the head between the at least two movable locking elements and configured to exert and apply stress on the respective support face of each locking element by contacting each locking element to tighten and to lock each wire between the tightening face of the respective locking element and the associated tightening surface; and
    a connecting system between the housing and the support body,
    wherein the hub is integral with one or more of the housing and the support body, and
    the housing comprises at least two openings for passage of the wires therethrough.

2. The rotary cutting head according to claim 1, wherein each locking element is mounted to pivot around a pivoting shaft, each pivoting shaft being integral with the respective locking element and configured to be mounted in a bearing fixed on the support body by a bearing support.

3. The rotary cutting head according to claim 2, wherein each tightening surface extends in a plane that is perpendicular or inclined relative to the axis of rotation of said head, and
    the pivoting shaft of each locking element extending parallel to said tightening surfaces.

4. The rotary cutting head according to claim 2, wherein each bearing support has at least one opening for insertion of the pivoting shaft in the bearing of said support, each insertion opening being delimited by elastically deformable walls such that the pivoting shaft of each locking element is insertable in the respective bearing by reversible elastic interlocking to enable disassembly of each locking element of the support body.

5. The rotary cutting head according to claim 2, wherein each locking element has two first opposing lateral faces and two second opposing faces that are perpendicular to said first faces, one of said second opposing faces forming the tightening face and the other second opposing face forming the support face, the pivoting shaft of each locking element passing through said first faces in a perpendicular manner and includes two lateral shafts or journals each fixed on one of said first faces.

6. The rotary cutting head according to claim 5, wherein each bearing support comprises two opposite flanges each integrating a bearing configured to accommodate, in a perpendicular manner to said flanges, one of the two lateral shafts or pivots of the respective locking element such that each locking element is configured to pivot between the two corresponding flanges, each tightening surface extending between the two flanges of one of said bearing supports, the space separating said flanges forming a passage to accommodate and guide, extending radially relative to the axis of rotation of the head, for each wire in the support body for tightening and locking of each wire.

7. The rotary cutting head according to claim 2, wherein the winding shaft is fixed in the support body and includes a peripheral wall comprising two passage openings enabling the passage of each wire through one of the openings, and
    wherein said head further comprises two concentric chambers, including a central chamber that is delimited between the hub and the peripheral wall and that accommodates the support body locking system and a peripheral chamber that is delimited between said peripheral wall and the inner wall of the housing that is configured to accommodate the winding of each wire.

8. The rotary cutting head according to claim 7, wherein the peripheral wall has a cylindrical shape, of which one of the end faces is open and the other end face is closed by a bottom, and
    wherein each bearing is fixed on said bottom.

9. The rotary cutting head according to claim 1, wherein the hub comprises
    a first hub part that is integral with or integrated in the housing,
    a second hub part that is integral with or integrated in the support body, and
    the connecting system connecting said first and second hub parts with one another and in the extension with one another by preventing their rotation relative to one another, said connecting system connecting the housing and said support body together, with locking in rotation relative to one another, to allow the rotation of the head, locked axially on the drive shaft, or disconnection of the housing from the support body to enable the disassembly of the head or the access to the locking elements, or when the support body and the housing are mounted in rotation relative to one another, enabling the winding of each wire in the state of insertion of each wire with tightening and locking in the head.

10. The rotary cutting head according to claim 9, wherein the connecting system includes striae made in each hub part.

11. The rotary cutting head according to claim 1, wherein the single elastic element is a single helical spring coaxially surrounding the hub, over all or part of its length, said hub axially passing through said helical spring.

12. The rotary cutting head according to claim 11, wherein said spring is held axially between a first stop face, integral with the housing, and either
   (i) in a state of insertion of each wire, each support face of the locking elements by exerting a tightening stress on the locking elements, or
   (ii) in the a in which the wires are not inserted, a second stop face forming a stop preventing the spring from coming into contact with said support faces of the locking elements.

13. The rotary cutting head according to claim 12, wherein the first stop face is adjusted by axial spacing relative to each support face or to the second stop face to adjust a return force of the single helical spring and therefore the stress exerted by the single helical spring on each locking element.

14. An assembly comprising:
   the rotary cutting head according to claim 1;
   a drive shaft for a portable motorized cutting device, said drive shaft configured to be mounted in the hub of said head to ensure transmission of the drive torque to the head;
   wherein the axial locking system comprises a controller and is configured to enable,
      from a state of insertion with pre-tightening of each wire and pre-stressing of the single elastic element, the locking or axial unlocking of the head on the drive shaft,
      in the state of locking, establishing the tightening stress of the elastic element on the locking elements to implement the tightening and the locking of each wire in the head, and
      in the state of unlocking, for eliminating said tightening stress.

15. The assembly, according to claim 14, wherein the axial locking system is configured either
   in the locking state, for establishing the connection, using the connecting system for connection and locking, between the first and second hub parts, or
   in the unlocking state, for establishing, under the action of the single elastic element exerting stress against said connection, the disconnection between said first and second hub parts.

16. The assembly, according to claim 14, wherein the drive shaft ends at its free end by a connecting tip, and
   wherein the axial locking system comprises the tip and a control piece, forming said controller, mounted in rotation, around the axis of said head, on said tip and working with the support body such that the rotation of the control piece causes a translational movement of the support body in the housing, along the axis of rotation of the head, to enable, according to the direction of rotation of said piece, either
   in a direction of rotation to implement the locking, to establish said tightening stress, and the connection between the first and second hub parts, or
   in a direction of rotation implementing the unlocking, to eliminate said tightening stress, and the disconnection between said first and second hub parts.

17. The assembly, according to claim 16, wherein the tip comprises a threading made on its outer lateral face, and
   wherein the control piece comprises a tapping to enable a connection by screwing between the control piece and the tip and the rotation of the tip.

18. The rotary cutting head according to claim 3, wherein each pivoting shaft is integral with the respective locking element, each bearing support having at least one opening for insertion of the pivoting shaft in the bearing of said support, each insertion opening being delimited by elastically deformable walls such that the pivoting shaft of each locking element is insertable in the respective bearing by reversible elastic interlocking to enable disassembly of each locking element of the support body.

19. The rotary cutting head according to claim 1, wherein the support body locking system is further used with a winding shaft integral with the support body to enable the winding of each wire.

20. The rotary cutting head according to claim 19, wherein the support body and the housing are mounted in rotation relative to one another to enable the winding of each wire, in a tightening and locking state, around the winding shaft.

* * * * *